US012808985B2

(12) United States Patent
Kurono et al.

(10) Patent No.: US 12,808,985 B2
(45) Date of Patent: Nov. 24, 2026

(54) RADAR SYSTEM AND AZIMUTH ESTIMATION METHOD

(71) Applicant: DENSO CORPORATION, Kariya-city (JP)

(72) Inventors: Yasuhiro Kurono, Kariya-city (JP); Takuya Takayama, Kariya-city (JP); Yutaka Hasegawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 259 days.

(21) Appl. No.: 18/584,871

(22) Filed: Feb. 22, 2024

(65) Prior Publication Data

US 2024/0192302 A1 Jun. 13, 2024

Related U.S. Application Data

(63) Continuation of application No. PCT/JP2022/031549, filed on Aug. 22, 2022.

(30) Foreign Application Priority Data

Aug. 24, 2021 (JP) ................................ 2021-136368

(51) Int. Cl.
*G01S 7/40* (2006.01)
*G01S 13/931* (2020.01)

(52) U.S. Cl.
CPC ............. *G01S 7/403* (2021.05); *G01S 13/931* (2013.01)

(58) Field of Classification Search
CPC ............................... G01S 7/403; G01S 13/931
See application file for complete search history.

(56) References Cited

U.S. PATENT DOCUMENTS 4,806,936 A * 2/1989 Williams ................ G01S 13/46 342/126
2015/0130655 A1 5/2015 Aizawa
2020/0363522 A1 11/2020 Ishikawa
2021/0028826 A1 1/2021 Takahashi
2021/0325510 A1* 10/2021 Bialer .................. G01S 13/584
2022/0268911 A1* 8/2022 Wu ......................... G01S 7/356

OTHER PUBLICATIONS

Huang, Jin-de, et al., “Direction-of-Arrival Estimation of Arry Steering Matrix Moore-Penrose Inverse”, vol. 32, No. 7, Article ID: 1003-0530(2016)07-0842-07, Journal of Signal Processing, Jul. 2016, in 27 pages with machine translation.

* cited by examiner

*Primary Examiner* — Vladimir Magloire
*Assistant Examiner* — Hailey R Le
(74) *Attorney, Agent, or Firm* — Precision Patents, P.C.

(57) ABSTRACT

A radar system of one aspect of the present disclosure includes a plurality of transmitting antennas, a plurality of receiving antennas, an azimuth estimation unit, a restoration unit (S30), an error calculation unit, and a false azimuth determination unit. The azimuth estimation unit estimates an azimuth of a target based on a first received signal received by a virtual array. The restoration unit calculates a second received signal from an estimated power of the first received signal which corresponds to a signal restored from the first received signal, assuming that the transmitting azimuth is the same as an arrival azimuth. The false azimuth determination unit determines that the estimated azimuth is a false azimuth when the errors between the first received signal and the second received signal are larger than a determination threshold.

6 Claims, 14 Drawing Sheets

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | $0*\alpha$ | $0*\alpha$ | $2*\alpha$ | $2*\alpha$ | $4*\alpha$ | $4*\alpha$ |
| Rx PHASE | $0*\alpha$ | $1*\alpha$ | $0*\alpha$ | $1*\alpha$ | $0*\alpha$ | $1*\alpha$ |
| TOTAL PHASE | $0*\alpha$ | $1*\alpha$ | $2*\alpha$ | $3*\alpha$ | $4*\alpha$ | $5*\alpha$ |

| Tx | Tx1 | Tx1 | Tx1 | Tx1 | Tx1 | Tx1 |
|---|---|---|---|---|---|---|
| Rx | Rx1 | Rx2 | Rx3 | Rx4 | Rx5 | Rx6 |
| Tx PHASE | $0*\alpha$ | $0*\alpha$ | $0*\alpha$ | $0*\alpha$ | $0*\alpha$ | $0*\alpha$ |
| Rx PHASE | $0*\alpha$ | $1*\alpha$ | $2*\alpha$ | $3*\alpha$ | $4*\alpha$ | $5*\alpha$ |
| TOTAL PHASE | $0*\alpha$ | $1*\alpha$ | $2*\alpha$ | $3*\alpha$ | $4*\alpha$ | $5*\alpha$ |

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | $0*\alpha$ | $0*\alpha$ | $2*\alpha$ | $2*\alpha$ | $4*\alpha$ | $4*\alpha$ |
| Rx PHASE | $0*\beta$ | $1*\beta$ | $0*\beta$ | $1*\beta$ | $0*\beta$ | $1*\beta$ |
| TOTAL PHASE | $0*\alpha+0*\beta$ | $0*\alpha+1*\beta$ | $2*\alpha+0*\beta$ | $2*\alpha+1*\beta$ | $4*\alpha+0*\beta$ | $4*\alpha+1*\beta$ |

| TRANSMITTING ANTENNA No. | RECEIVING ANTENNA No. | | VIRTUAL ARRAY No. |
|---|---|---|---|
| 1 | 1 | → | 1 |
| 1 | 2 | → | 2 |
| 2 | 1 | → | 3 |
| 2 | 2 | → | 4 |
| 3 | 1 | → | 5 |
| 3 | 2 | → | 6 |

| VIRTUAL ARRAY No. |
| --- |
| 1 |
| 2 |
| 3 |
| 4 |
| 5 |
| 6 |

$$s = (A^H A)^{-1} A^H x$$

$$y = A s$$

$$e = abs(x - y)$$

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | 0∗α | 0∗α | 2∗α | 2∗α | 4∗α | 4∗α |
| Rx PHASE | 0∗α | 1∗α | 0∗α | 1∗α | 0∗α | 1∗α |
| TOTAL PHASE | 0∗α | 1∗α | 2∗α | 3∗α | 4∗α | 5∗α |

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | 0∗α | 0∗α | 2∗α | 2∗α | 4∗α | 4∗α |
| Rx PHASE | 0∗α | 1∗α | 0∗α | 1∗α | 0∗α | 1∗α |
| TOTAL PHASE | 0∗α | 1∗α | 2∗α | 3∗α | 4∗α | 5∗α |

RADAR SYSTEM AND AZIMUTH ESTIMATION METHOD

CROSS-REFERENCE TO RELATED APPLICATION

This application is the U.S. bypass application of International Application No. PCT/JP2022/031549 filed on Aug. 22, 2022 which designated the U.S. and claims priority to Japanese Patent Application No. 2021-136368 filed on Aug. 24, 2021, the contents of both of which are incorporated herein by reference.

TECHNICAL FIELD

The present disclosure relates to a radar system.

BACKGROUND

The radar system described in WO2019/155625 performs azimuth estimation using multiple input and multiple output (MIMO). Specifically, the radar system described above performs two-dimensional azimuth estimation of the transmitting azimuth and receiving azimuth using a steering vector that considers both the transmitting azimuth and the receiving azimuth, and identifies a signal having a receiving azimuth different from the transmitting azimuth. The radar system described above corrects the correlation matrix based on the identified signal so that the accuracy of azimuth estimation does not decrease due to the detection of a false azimuth in which no target exists.

SUMMARY

A radar system of one aspect of the present disclosure includes a plurality of transmitting antennas, a plurality of receiving antennas, an azimuth estimation unit, a restoration unit, an error calculation unit, and a false azimuth determination unit. The azimuth estimation unit is configured to estimate an azimuth of a target based on a first received signal received by a virtual array. The virtual array comprises the plurality of transmitting antennas and the plurality of receiving antennas. The restoration unit is configured to calculate a second received signal from a mode matrix and an estimated power of the first received signal in the azimuth estimated by the azimuth estimation unit, assuming that a transmitting azimuth of the plurality of the transmitting antennas is the same as an arrival azimuth of the first received signal. The second received signal corresponds to a signal restored from the first received signal. The error calculation unit is configured to calculate errors from the first received signal and the second received signal. The false azimuth determination unit determines that the azimuth estimated by the azimuth estimation unit is a false azimuth in response to the errors being calculated by the error calculation unit are larger than a set determination threshold.

An azimuth estimation method of another aspect of the present disclosure transmits a transmitted wave from a plurality of transmitting antennas and estimates an azimuth of a target based on a first received signal received by a virtual array. The virtual array comprises a plurality of transmitting antennas and a plurality of receiving antennas. A second received signal is calculated assuming that a transmitting azimuth of the plurality of transmitting antennas and an arrival azimuth of the first received signal are the same from an estimated mode matrix at the azimuth and the estimated power. The second received signal corresponding to a signal restored from the first received signal, errors are calculated from the first received signal and the second received signal, and the estimated azimuth is determined to be a false azimuth when the calculated errors are larger than a set determination threshold.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
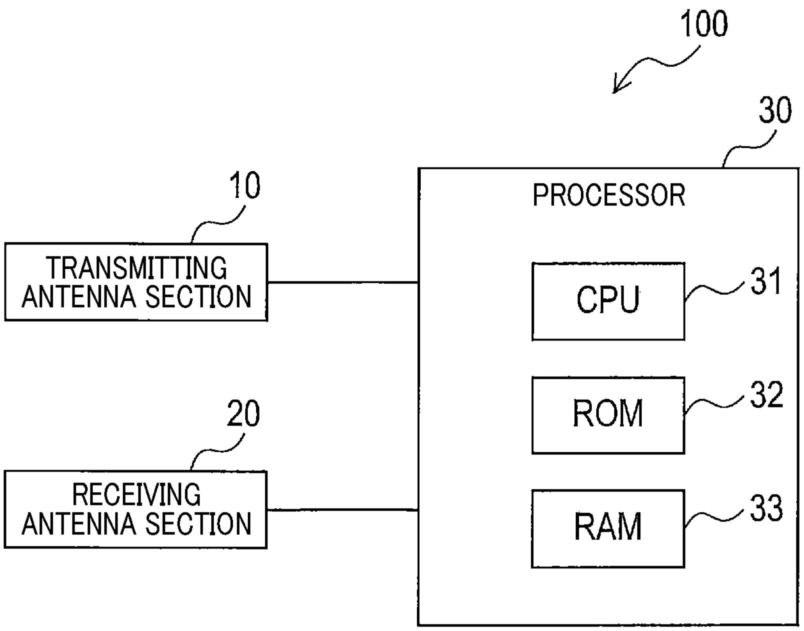
FIG. 1 shows a block diagram of a schematic configuration of a radar system according to a first embodiment.

As a result of the inventor's detailed study, the radar system described in WO2019/155625 performs two-dimensional azimuth estimation using a steering vector that considers both the transmitting and receiving azimuths, and thus the processing load is large and it is found difficult to perform two-dimensional azimuth estimation for all detected azimuths.

An aspect of the present disclosure provides a radar system capable of determining false azimuth while suppressing the processing load from increasing.

A radar system of one aspect of the present disclosure includes a plurality of transmitting antennas, a plurality of receiving antennas, an azimuth estimation unit, a restoration unit, an error calculation unit, and a false azimuth determination unit. The azimuth estimation unit is configured to estimate an azimuth of a target based on a first received signal received by a virtual array. The virtual array comprises the plurality of transmitting antennas and the plurality of receiving antennas. The restoration unit is configured to calculate a second received signal from a mode matrix and an estimated power of the first received signal in the azimuth estimated by the azimuth estimation unit, assuming that a transmitting azimuth of the plurality of the transmitting antennas is the same as an arrival azimuth of the first received signal. The second received signal corresponds to a signal restored from the first received signal. The error calculation unit is configured to calculate errors from the first received signal and the second received signal. The false azimuth determination unit determines that the azimuth estimated by the azimuth estimation unit is a false azimuth in response to the errors being calculated by the error calculation unit are larger than a set determination threshold.

In the radar system of one aspect of the present disclosure, the second received signal is calculated from the mode matrix and estimated power at the estimated azimuth, assuming that the transmitting azimuth and the arrival azimuth are the same. The second received signal corresponds to the signal restored from the first received signal. If the assumption that the transmission and arrival azimuths are the same is correct, the second received signal is approximately the same as the first received signal, and if the above assumption is incorrect, the error between the second and first received signals becomes large. In other words, if the transmitting azimuth and the arrival azimuth differ significantly and the target does not exist at the estimated azimuth, the error between the second received signal and the first received signal becomes large. Therefore, if the error is greater than the determination threshold, the estimated azimuth is determined to be a false azimuth where no target actually exists. In addition, since the second received signal is only calculated assuming that the transmitting azimuth and arrival azimuth are the same, the processing load can be suppressed from increasing compared to the case where two-dimensional azimuth estimation is performed. Therefore, false azimuth can be detected while suppressing the processing load from increasing.

An azimuth estimation method of another aspect of the present disclosure transmits a transmitted wave from a plurality of transmitting antennas and estimates an azimuth of a target based on a first received signal received by a virtual array. The virtual array comprises a plurality of transmitting antennas and a plurality of receiving antennas. A second received signal is calculated assuming that a transmitting azimuth of the plurality of transmitting antennas and an arrival azimuth of the first received signal are the same from an estimated mode matrix at the azimuth and the estimated power. The second received signal corresponding to a signal restored from the first received signal, errors are calculated from the first received signal and the second received signal, and the estimated azimuth is determined to be a false azimuth when the calculated errors are larger than a set determination threshold.

The azimuth estimation method of another aspect has the same effect as the above radar system.

The following is a description of embodiments of the present disclosure with reference to the drawings.

1. First Embodiment

1-1. Configuration of Radar System

The configuration of a radar system 100 is described with reference to FIG. 1.

The radar system 100 includes a transmitting antenna section 10, a receiving antenna section 20, and a processor 30. In the present embodiment, the radar system 100 is mounted on a moving body, specifically a vehicle 50.

The processor 30 includes a CPU 31, ROM 32, and RAM 33, and the CPU 31 executes a program stored in the ROM 32 to realize various functions. A method of realizing these functions is not limited to software, and a part of or all of the functions may be realized using hardware that combines logic circuits, analog circuits, etc.

The processor 30 supplies a transmission signal of a predetermined frequency to the transmitting antenna section 10. In addition, the processor 30 processes received signals output from the receiving antenna section 20 to calculate an azimuth of a target relative to the radar system 100, the distance from the radar system 100 to the target, and the speed of the target relative to the radar system 100.

The transmitting antenna section 10 includes M transmitting antennas Txm (M is an integer greater than or equal to 2, m=1, . . . , M). The receiving antenna section 20 includes N receiving antennas Rxn (N is an integer greater than or equal to 2, n=1, . . . , N). The radar system 100 is a Multiple Input and Multiple Output (MIMO) radar system that simultaneously transmits and receives radio waves with a plurality of antennas.

Figure 2:
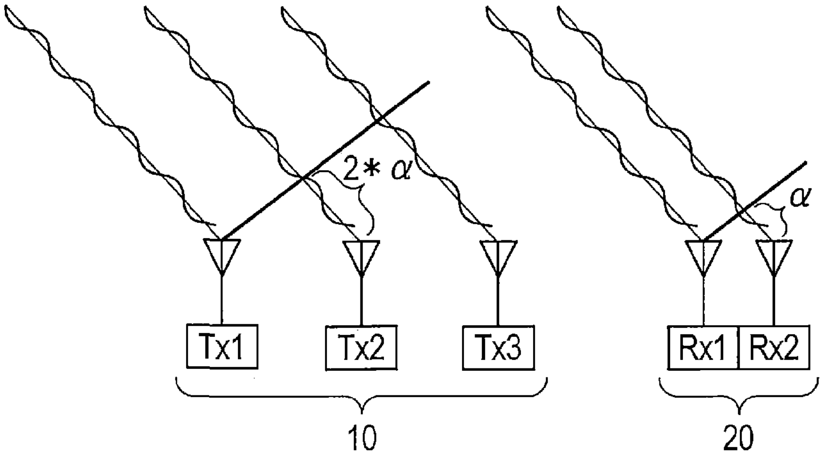
FIG. 2 shows a diagram illustrating a phase of a received signal received by a virtual array consisting of three transmitting antennas and two receiving antennas.

As shown in FIG. 2, the transmitting antenna section 10 according to the present embodiment includes three transmitting antennas Tx1, Tx2, and Tx3. The transmitting antennas Tx1, Tx2, and Tx3 simultaneously and repeatedly transmit transmitted waves to predetermined transmitting azimuths based on the transmission signals supplied by the processor 30.

The transmitting antennas Tx1, Tx2, and Tx3 are arranged in a row with spacing D1 along a predetermined array direction. The transmitting antennas Tx1, Tx2, and Tx3 transmit transmitted waves of a predetermined frequency from transmitting antennas Tx1, Tx2, and Tx3 to a predetermined transmitting azimuth. The transmitting antennas Tx1, Tx2, and Tx3 are arranged so that a phase difference of $2\times\alpha$ occurs between adjacent antennas on the path to the target.

As shown in FIG. 2, the receiving antenna section 20 includes two receiving antennas Rx1 and Rx2. The receiving antennas Rx1 and Rx2 are arranged in a row with spacing D2 along a predetermined array direction. The receiving antennas Rx1 and Rx2 receive reflected waves of a predetermined frequency arriving from a predetermined arrival azimuth (i.e., receiving azimuth) and output receive signals. The receiving antennas Rx1 and Rx2 are arranged so that a phase difference of $\alpha$ occurs between adjacent antennas in the path from the target.

Each of the receiving antennas Rx1 and Rx2 receives the reflected wave generated when the transmitted wave from the transmitting antennas Tx1, Tx2, and Tx3 is reflected by the target. Each of the receiving antennas Rx1 and Rx2 repeatedly receives three reflected waves that are out of phase by $2\times\alpha$ and repeatedly outputs three received signals that differ in phase by $2\times\alpha$.

The phase of receiving antenna Rx2 is α out of phase with that of receiving antenna Rx1. Thus, as shown in FIG. 2, the receiving antenna section 20 outputs six received signals that are out of phase by α. In the present embodiment, the phase difference Δφ2 of the N receiving antennas Rxn is 1/N of the phase difference Δφ1 of the M transmitting antennas Txm. Therefore, the receiving antenna section 20 outputs M×N received signals that are out of phase by Δφ2.

Figure 3:
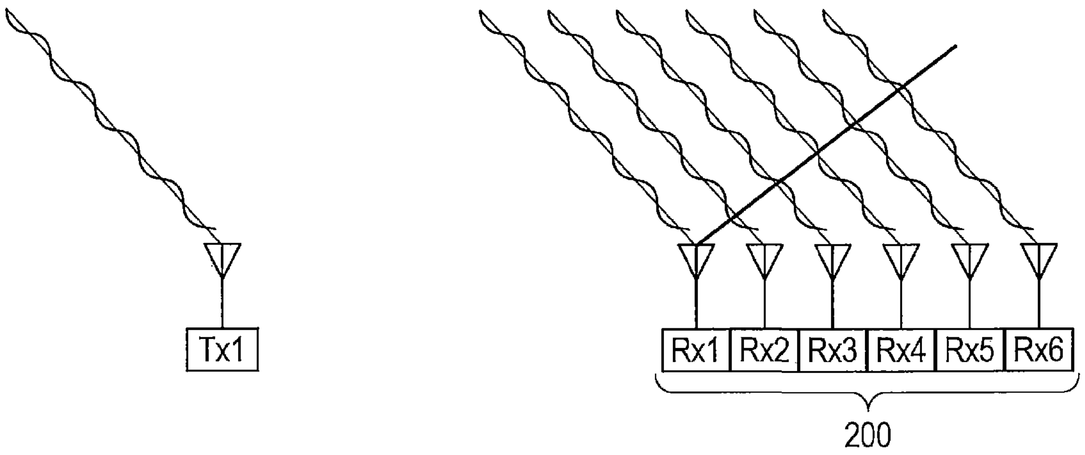
FIG. 3 shows a diagram illustrating a phase of the received signals received by six receiving antennas.

The received signals output from the receiving antenna section 20 is equal to the received signals output from the six receiving antennas Rx1, Rx2, Rx3, Rx4, Rx5, and Rx6 shown in FIG. 3. The six receiving antennas Rx1, Rx2, Rx3, Rx4, Rx5, and Rx6 shown in FIG. 3 are arranged along a predetermined array direction so that a phase difference α occurs between adjacent antennas in the path from the target.

In other words, the radar system 100 virtually forms M×N receiving antennas from the M transmitting antennas Txm and the N receiving antennas Rxn. In the following, the virtual M×N receiving antennas formed by the radar system 100 are referred to as virtual arrays.

By forming the virtual arrays with the M+N antennas, the radar system 100 achieves the same azimuth resolution as a radar system with one transmitting antenna and the M×N receiving antennas.

1-2. Ghosting Situation

Figure 4:
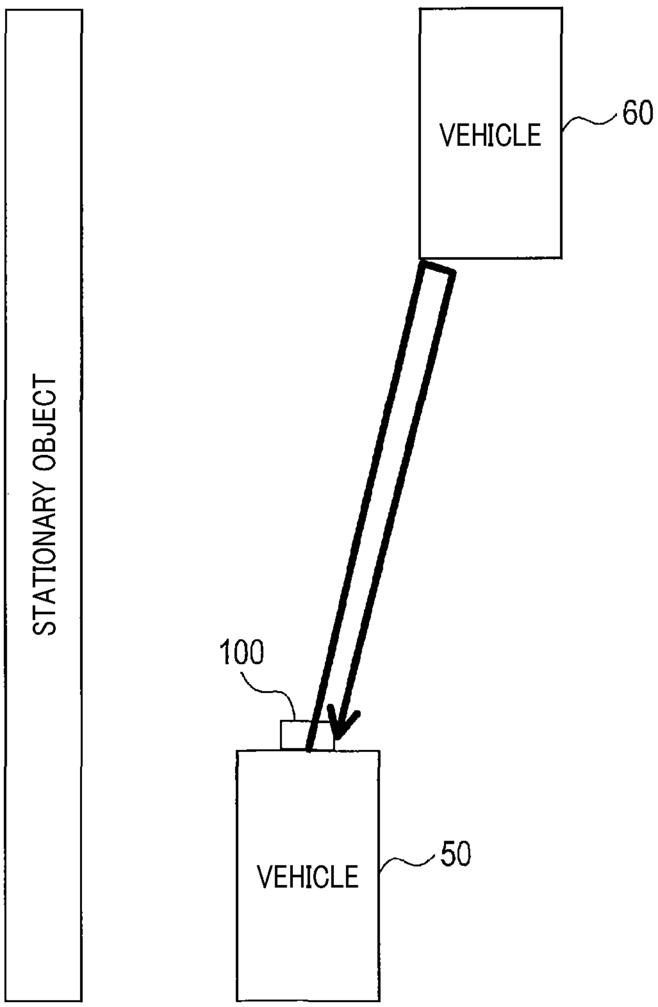
FIG. 4 shows an example of a situation where a transmitting azimuth is the same as a receiving azimuth and no ghosting occurs.
Figure 5:
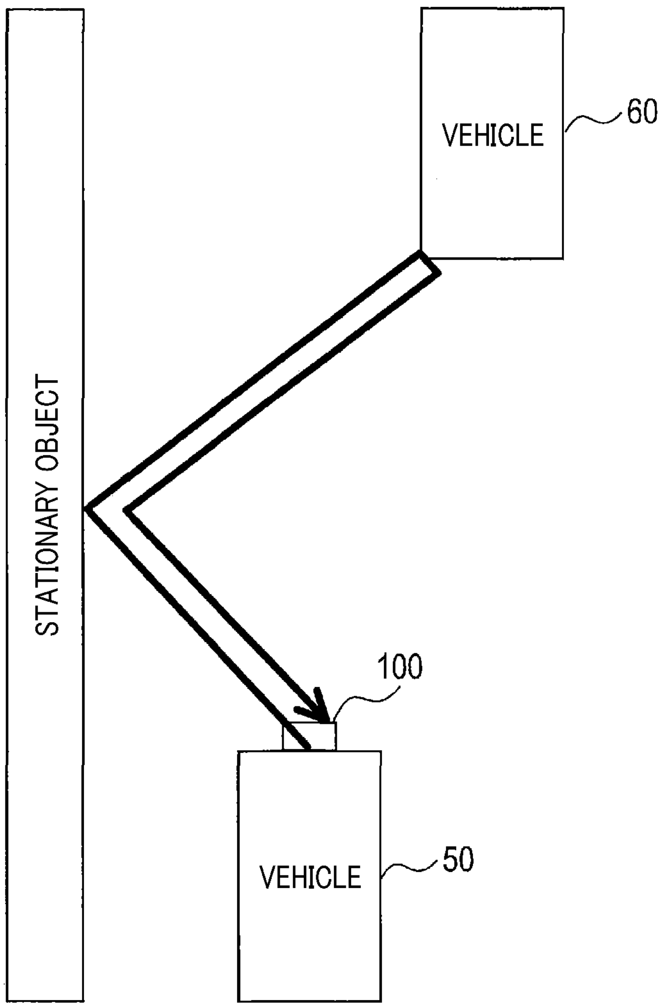
FIG. 5 shows another example of a situation where the transmitting azimuth is the same as the receiving azimuth and no ghosting occurs.

The radar system 100 processes the received signals received by the formed virtual arrays to estimate the azimuth of the target. As shown in FIGS. 4 and 5, if the transmission azimuth of the transmitted wave coincides with the receiving azimuth of the reflected wave (i.e., the azimuth in which the reflected wave arrives), the radar system 100 can estimate the azimuth with high resolution and accuracy.

Figure 6:
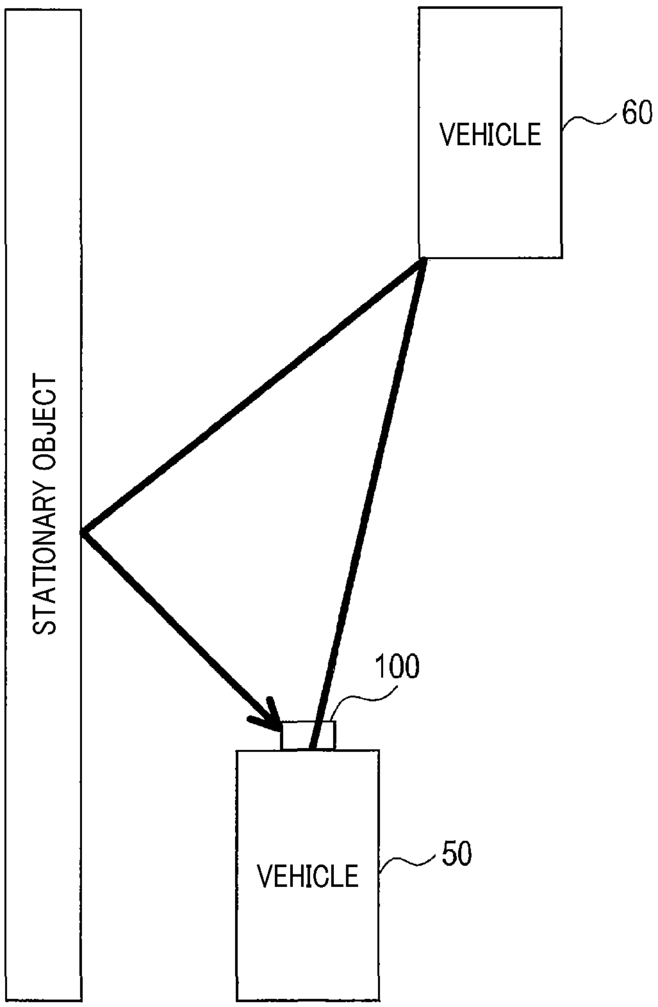
FIG. 6 shows an example of a situation where the transmitting azimuth is different from the receiving azimuth and ghosting occurs.
Figure 7:
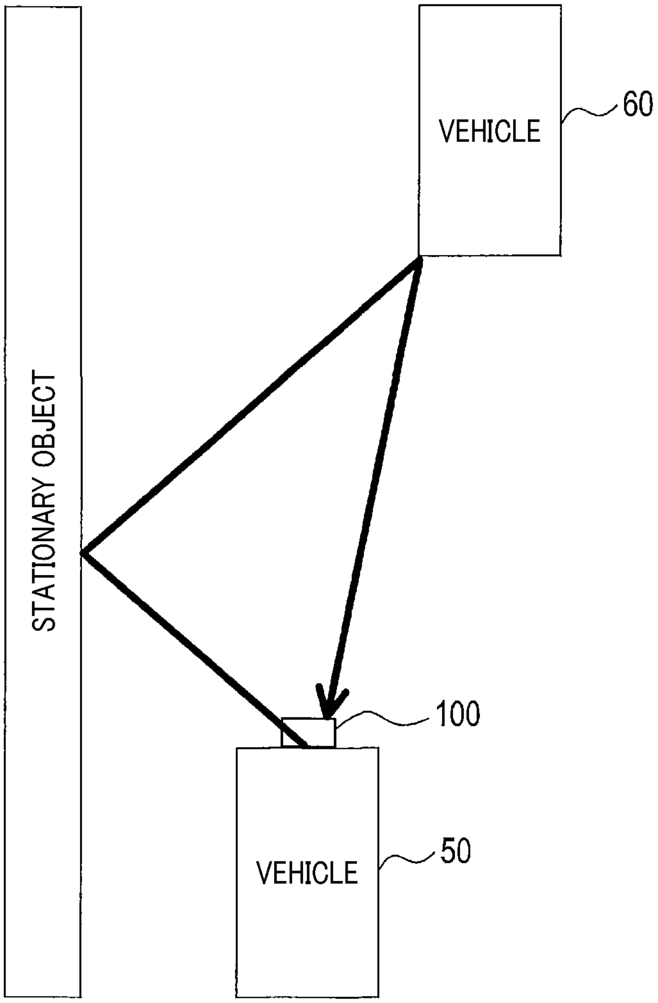
FIG. 7 shows another example of a situation where the transmitting azimuth is different from the receiving azimuth and ghosting occurs.
Figure 8:
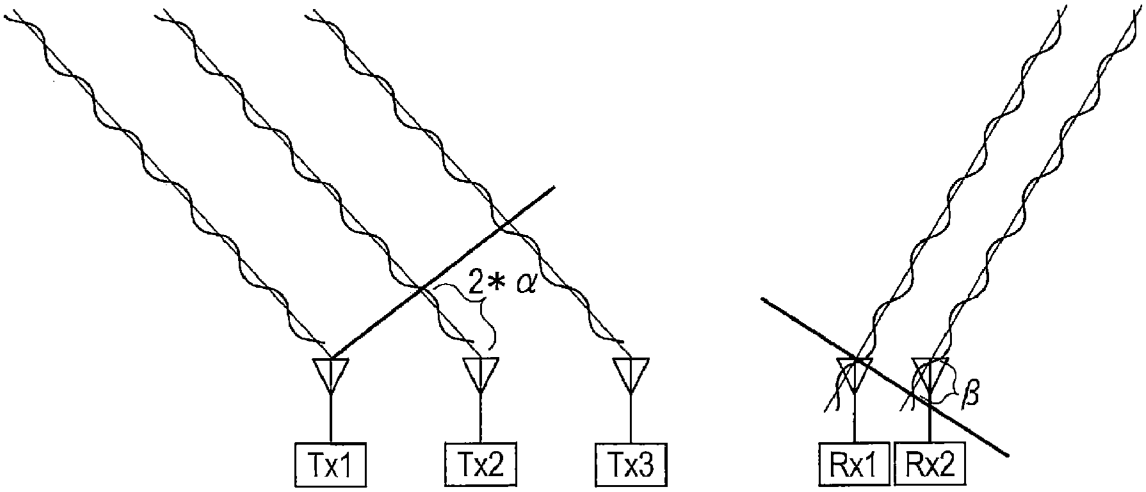
FIG. 8 shows a phase of the received signal in the virtual array when the transmitting azimuth is different from the receiving azimuth.

On the other hand, as shown in FIGS. 6 and 7, if the transmitting azimuth is different from the receiving azimuth, a false azimuth is estimated that is different from the actual azimuth of the target. As shown in FIG. 8, when the reflected wave arrives at the receiving antennas Rx1 and Rx2 from a different azimuth from the transmitting azimuth, the phase difference between receiving antennas Rx1 and Rx2 in the path from the target changes from α to β.

Therefore, the phase of the received signals output from the virtual arrays will be 0, β, 2×α, 2×α+β, 4×α, 4×α+β, and the phase difference between the received signals will not be constant. As a result, the accuracy of azimuth estimation based on the received signal is reduced and a false azimuth is estimated (i.e., ghosting occurs). The radar system 100 then determines whether the estimated azimuth based on the received signal output from the virtual array is a real or false azimuth.

1-3. Azimuth Estimation Process

Figures 9, 10:
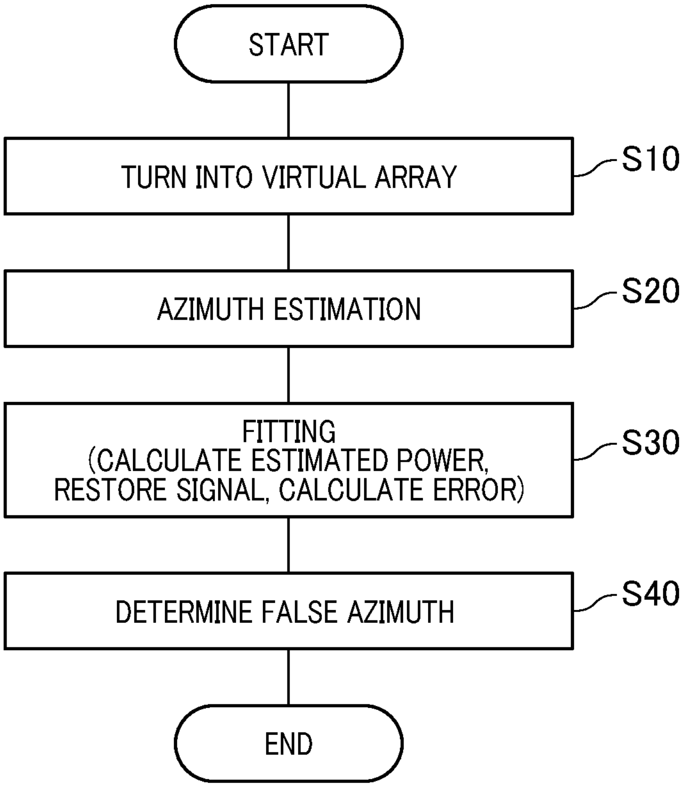
FIG. 9 shows a flowchart of a procedure of an azimuth estimation process according to the first embodiment.
FIG. 10 shows a diagram illustrating an overview of turning the antennas into the virtual arrays according to the first embodiment.

Next, the azimuth estimation process performed by the processor 30 according to the present embodiment is explained with reference to the flowchart in FIG. 9. The processor 30 repeats the azimuth estimation process at a predetermined cycle.

In S10, the processor 30 creates a virtual array. Specifically, the processor 30 forms M×N virtual arrays from the M transmitting antennas Txm and the N receiving antennas Rxn, and acquires M×N received signals received by the virtual arrays. Next, as shown in FIG. 10, the processor 30 reorders the M×N received signals. The order is from smallest phase to largest phase, such as 0×α, 1×α, 2×α, 3×α, 4×α, and 5×α for the total phases shown in FIG. 2. In the following, a received signal received by the virtual array is referred to as a first received signal x. The first received signal x is a vector with M×N elements.

Figures 11, 12:
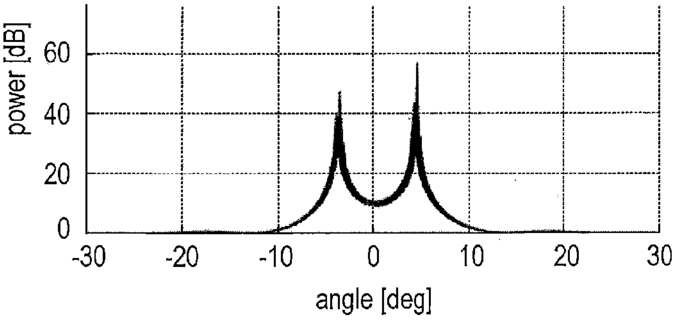
FIG. 11 shows a diagram illustrating an overview of azimuth estimation according to the first embodiment.
FIG. 12 shows a diagram illustrating a process of calculating estimated power at an estimated azimuth according to the first embodiment.

Next, in S20, the processor 30 estimates an azimuth of the target based on the reordered M×N received signals. For example, as shown in FIG. 11, the processor 30 applies the MUSIC method to calculate an azimuth spectrum and obtains an azimuth to a peak of the azimuth spectrum as the azimuth of the target. In the example shown in FIG. 11, the azimuths of the two targets are estimated. Hereafter, the azimuth estimated in S20 is referred to as an estimated azimuth, and a vector having the K estimated azimuths as elements is referred to as an azimuth vector θ. K is the number of azimuths estimated in S20. Note that the method of estimating azimuth is not limited to MUSIC. For example, DBF, Capon, ESPRIT, and other methods may be applied to estimate the azimuth of the target.

Next, in S30, the processor 30 performs fitting. In detail, the processor 30 calculates a second received signal y from a mode matrix A and estimated power s, assuming that the transmission azimuth of the transmitted wave and the azimuth at which the first received signal x arrived (i.e., the receiving azimuth) are the same. The mode matrix A is an L×K matrix that arranges the mode matrices at the K estimated azimuths. L is L=M×N. In other words, the mode matrix A is a 6×2 matrix in the present embodiment. The L×K elements of the mode matrix A depend on each of the estimated azimuths. The estimated power s is the estimated power of the first received signal s at the K estimated azimuths and is a vector with K elements.

The second received signal y is a vector with the M×N elements and corresponds to the signal restored from the first received signal x based on the above assumptions. Here, the process of restoring the first received signal x based on the above assumptions and calculating the error e, which is discussed below, is referred to as fitting.

If the above assumption is correct, the second received signal y is approximately equal to the first received signal x. If the above assumption is incorrect, that is, in a situation where the transmitting azimuth differs from the receiving azimuth and ghosting occurs, the second received signal y will not match the first received signal x, and the error e between the second received signal y and the first received signal x will become large. Therefore, based on the error e between the second received signal y and the first received signal x, it can be determined whether each element of the azimuth vector θ is the azimuth of a real object or a false azimuth where no object exists.

In S30, the processor 30 first calculates the estimated power s using the generalized inverse of the mode matrix A. Specifically, as shown in FIG. 12, the processor 30 calculates the estimated power s by multiplying the generalized inverse of the mode matrix A by the first received signal x. In addition, the processor 30 calculates the second received signal y by multiplying the mode matrix A by the estimated power s. In other words, the processor 30 calculates the second received signal y based on the formula y=As. The processor 30 then calculates the error e between the first received signal x and the second received signal y. Specifically, the processor 30 calculates the error e based on the formula e=abs (x-y).

Figure 13:
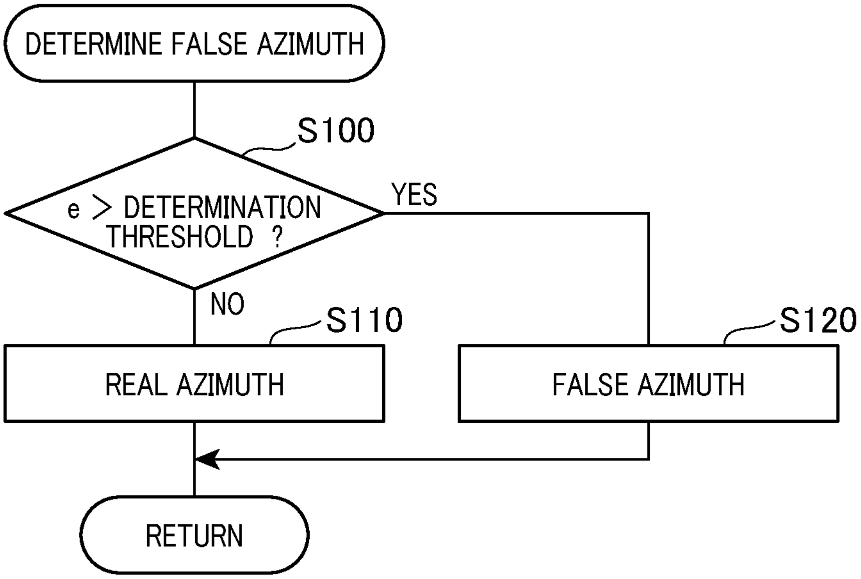
FIG. 13 shows a flowchart of a process of determining false azimuth according to the first embodiment.

Next, in S40, the processor 30 executes the false azimuth determination process. In detail, in S40, the processor 30 executes the subroutine shown in FIG. 13 to determine whether each estimated azimuth of the azimuth vector θ is a real or false azimuth.

In S100, the processor 30 determines whether the error e calculated in S30 is larger than the determination threshold. If the processor 30 determines that the error e is less than the determination threshold in S100, the process proceeds to S110. In S110, the processor 30 determines that each estimated azimuth of the azimuth vector θ is a real azimuth.

If the processor 30 determines that the error e is larger than the determination threshold in S100, the process proceeds to S120. In S120, the processor 30 determines that each estimated azimuth of the azimuth vector θ is a false azimuth.

1-4. Effects

According to the first embodiment detailed above, the following effects are achieved.

(1) The radar system 100 calculates the second received signal y from the mode matrix A at the estimated azimuth and the estimated power s at the estimated azimuth, assuming that the transmitting and receiving azimuths are the same. The second received signal y corresponds to the signal restored from the first received signal x. If the assumption that the transmitting and receiving azimuths are the same is correct, the second received signal y is approximately the same as the first received signal x, and if the above assumption is incorrect, the error e between the second received signal y and the first received signal x becomes large. In other words, if the transmitting and receiving azimuths differ significantly and there is no target at the estimated azimuth, the error e will become large. Therefore, if the error e is larger than the determination threshold, the estimated azimuth is determined to be a false azimuth where no target actually exists. In addition, since the processor 30 only calculates the second received signal y assuming that the transmitting and receiving azimuths are the same, the processing load can be suppressed from increasing compared to the case of two-dimensional azimuth estimation. Therefore, the processor 30 can determine the false azimuth while suppressing the processing load from increasing.

(2) By using the generalized matrix of the mode matrix A, the estimated power s can be easily calculated.

2. Second Embodiment 2-1. Differences From First Embodiment

Since the basic configuration of the second embodiment is similar to that of the first embodiment, the differences are described below. Note that the same reference symbols as in the first embodiment indicate the same configuration and refer to the preceding description. In the first embodiment described above, the difference between the first received signal x and the second received signal y was calculated as the error e. In contrast, the second embodiment differs in that the difference between the correlation matrix X of the first received signal x and the correlation matrix Y of the second received signal y is calculated as an error e. In other words, the error e is calculated based on the formula e=abs (X-Y) in the second embodiment.

According to the second embodiment described above, the error can be calculated from the correlation matrix X of the first received signal x and the correlation matrix Y of the second received signal y, while achieving the same effect as the effect (1) achieved by the first embodiment.

3. Third Embodiment

3-1. Differences From First Embodiment

Since the basic configuration of the third embodiment is similar to that of the first embodiment, the differences are described below. Note that the same reference symbols as in the first embodiment indicate the same configuration and refer to the preceding description.

In the first embodiment described above, the processor 30 calculated the estimated power s using the mode matrix A based on all the M transmitting antennas Txm and the N receiving antennas Rxn and the first receive signal x. In contrast, the third embodiment differs in that the processor 30 calculates the estimated power s using a mode matrix AA based on one transmitting antenna Txm and the N receiving antennas Rxn, or the M transmitting antennas Txm and one receiving antenna Rxn, and an extracted signal xx. The mode matrix AA is a K×N matrix or a K×M matrix. The extracted signal xx is a vector of elements from the first received signal x corresponding to the mode matrix AA. In other words, the extracted signal xx is a vector with the N or M elements.

3-2 Calculation of Estimated Power

Figure 14:
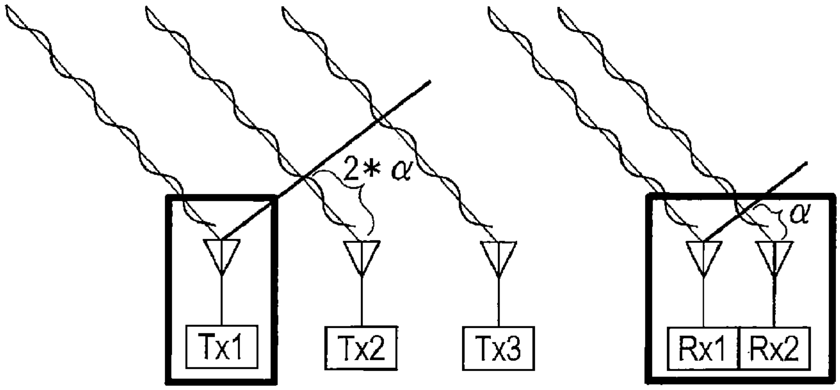
FIG. 14 shows an example of transmitting and receiving antennas corresponding to a mode matrix used to calculate estimated power according to a third embodiment.

FIG. 14 shows an example of generating the mode matrix AA based on the transmitting antenna Tx1 and the receiving antennas Rx1 and Rx2. In FIG. 14, the mode matrix AA is generated based on the antennas framed in bold. In other words, the N receiving antennas Rxn receive the reflected wave generated when the transmitted wave from one transmitting antenna Txm is reflected by the target. The processor 30 generates the mode matrix AA based on the N received signals output from the N receiving antennas Rxn. The extracted signal xx is a vector whose elements are these N received signals.

As shown in FIG. 14, since only one transmitting antenna is used, the phase difference between received signals is constant even if the transmitting and receiving azimuths are different. In other words, the processor 30 calculates the estimated power s using a combination of received signals that do not cause ghosting.

Figure 15:
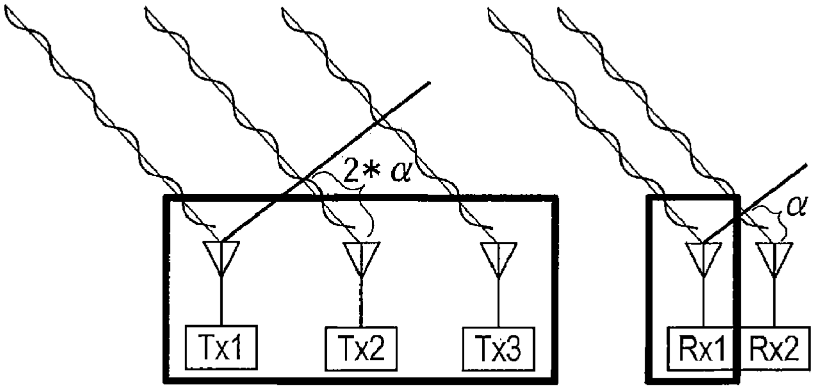
FIG. 15 shows another example of transmitting and receiving antennas corresponding to the mode matrix used to calculate the estimated power according to the third embodiment.

FIG. 15 shows an example of generating a mode matrix AA using M transmitting antennas Txm and one receiving antenna Rxn. In FIG. 15, the mode matrix AA is generated based on the antennas framed in bold. In other words, one receiving antenna Rxn receives the reflected wave generated when the transmitted wave from M transmitting antennas Txm is reflected by the target. The processor 30 generates the mode matrix AA based on the M received signals output from one receiving antenna Rxn. The extracted signal xx is a vector whose elements are these M received signals.

As shown in FIG. 15, since only one receiving antenna is used, the phase difference between received signals is constant even if the transmitting and receiving azimuths are different. In other words, the processor 30 calculates the accuracy of the estimated power s using combinations of received signals that do not cause ghosting.

3-3. Effects

According to the third embodiment detailed above, the same effects as the effects (1) and (2) of the first embodiment described above are achieved, and the estimated power can be calculated with higher accuracy.

4. Fourth Embodiment

4-1. Differences From First Embodiment

Since the basic configuration of the fourth embodiment is similar to that of the first embodiment, the differences are described below. Note that the same reference symbols as in the first embodiment indicate the same configuration and refer to the preceding description.

In the first embodiment described above, the processor 30 determined whether the estimated azimuth was real or false based on the calculated error e for one time (i.e., for one processing cycle). In contrast, the fourth embodiment differs from the first embodiment in that the processor 30 determines whether the estimated azimuth is real or false based on the number of times (number of processing cycles) that the error e exceeds a threshold.

The False Azimuth Determination Process

Figure 16:
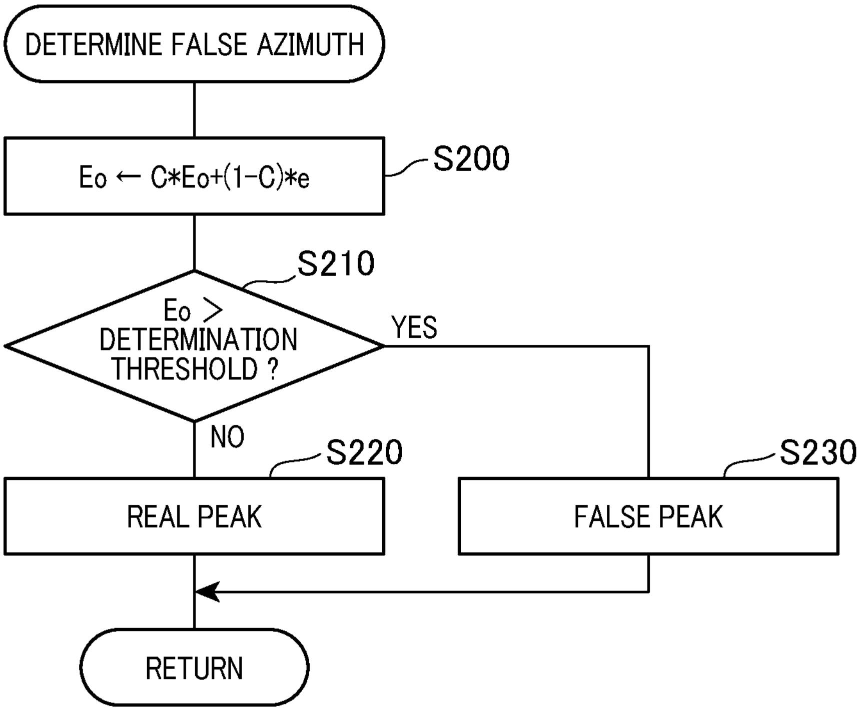
FIG. 16 shows a flowchart of a process for determining false azimuth according to a fourth embodiment.

Next, the false azimuth determination process performed by the processor 30 is explained with reference to the subroutine shown in FIG. 16. The processor 30 executes the subroutine shown in FIG. 16 to determine whether each estimated azimuth, which is an element of the azimuth vector θ, is a real or false azimuth.

First, in S200, the processor 30 calculates a weighted average value from an average error Eo calculated in the previous processing cycle and the error e calculated in S30, using the formula C×Eo+(1−C)×e, and the calculated weighted average value is an average error Eo in the current processing cycle. The average error Eo is a vector with K elements. C is a weighted average coefficient.

Next, in S210, the processor 30 determines whether the average error Eo calculated in S200 is larger than the determination threshold. If the processor 30 determines that the average error Eo is less than the determination threshold in S210, the process proceeds to S220. In S220, the processor 30 determines that each estimated azimuth is a real azimuth.

In addition, if the processor 30 determines that the average error Eo is larger than the determination threshold in S210, the process proceeds to S230. In S230, the processor 30 determines that each estimation element is a false azimuth.

4-3. Effects

According to the fourth embodiment described above, the same effects as effects (1) and (2) of the first embodiment described above are achieved, and it is possible to determine with higher accuracy whether the estimated azimuth is a false azimuth.

3. Other Embodiments

The embodiments of the present disclosure are described above. The present disclosure is not limited to the embodiments described above, but can be implemented with various variations.

(a) The calculation of error e in the second embodiment may be applied to the calculation of error e in the third embodiment.

(b) The calculation of error e in the second embodiment may be applied to the calculation of error e in the fourth embodiment.

(c) The calculation of the estimated power s in the third embodiment may be applied to the calculation of the estimated power s in the fourth embodiment.

(d) In addition to the radar system described above, the present disclosure can also be realized in various forms, such as a system comprising the radar system, a program for making a computer function as the radar system, a non-transitory tangible recording medium such as semiconductor memory recording this program, and a method for estimating azimuth.

What is claimed is:

1. A radar system comprising:

a plurality of transmitting antennas:

a plurality of receiving antennas;

an azimuth estimation unit configured to estimate an azimuth of a target based on a first received signal received by a virtual array, wherein the virtual array comprises the plurality of transmitting antennas and the plurality of receiving antennas;

a restoration unit configured to calculate a second received signal from a mode matrix and an estimated power of the first received signal in the azimuth estimated by the azimuth estimation unit, assuming that a transmitting azimuth of the plurality of transmitting antennas is the same as an arrival azimuth of the first received signal, wherein the second received signal corresponds to a signal restored from the first received signal;

an error calculation unit configured to calculate errors from the first received signal and the second received signal and a false azimuth determination unit that determines that the azimuth estimated by the azimuth estimation unit is a false azimuth in response to the errors calculated by the error calculation unit being larger than a set determination threshold.

2. The radar system according to claim 1, wherein the restoration unit is configured to calculate the estimated power at the azimuth using a generalized inverse of the mode matrix at the azimuth estimated by the azimuth estimation unit.

3. The radar system according to claim 1, wherein the error calculation unit is configured to calculate the error from a correlation matrix of the first received signal and a correlation matrix of the second received signal.

4. The radar system according to claim 1, wherein the restoration unit is configured to calculate the estimated power at the azimuth using the generalized inverse of the mode matrix based on one of the plurality of transmitting antennas and the plurality of receiving antennas, or based on the plurality of transmitting antennas and one of the plurality of receiving antennas.

5. The radar system according to claim 1, wherein the error calculation unit is configured to repeatedly calculate the error at a predetermined cycle, and the false azimuth determination unit is configured to determine whether the azimuth estimated by the azimuth estimation unit is a false azimuth based on a plurality of the errors calculated by the error calculation unit.

6. An azimuth estimation method performed by a processor included in a radar system, the radar system comprising a plurality of transmitting antennas and a plurality of receiving antennas, the azimuth estimation method comprising:

estimating an azimuth of a target based on a first received signal received by a virtual array, the virtual array comprising the plurality of transmitting antennas and a plurality of receiving antennas;

calculating an estimated power of the first received signal at the estimated azimuth;

calculating a second received signal assuming that a transmitting azimuth of the plurality of transmitting antennas and an arrival azimuth of the first received signal are the same from an estimated mode matrix at the azimuth and the estimated power, the second received signal corresponding to a signal restored from the first received signal;

calculating errors from the first received signal and the second received signal;

calculating the errors being larger than a set determination threshold; and determining the estimated azimuth is a false azimuth based on the calculated errors being larger than the set determination threshold.

* * * * *